INVENTOR:
FRITZ ELLER

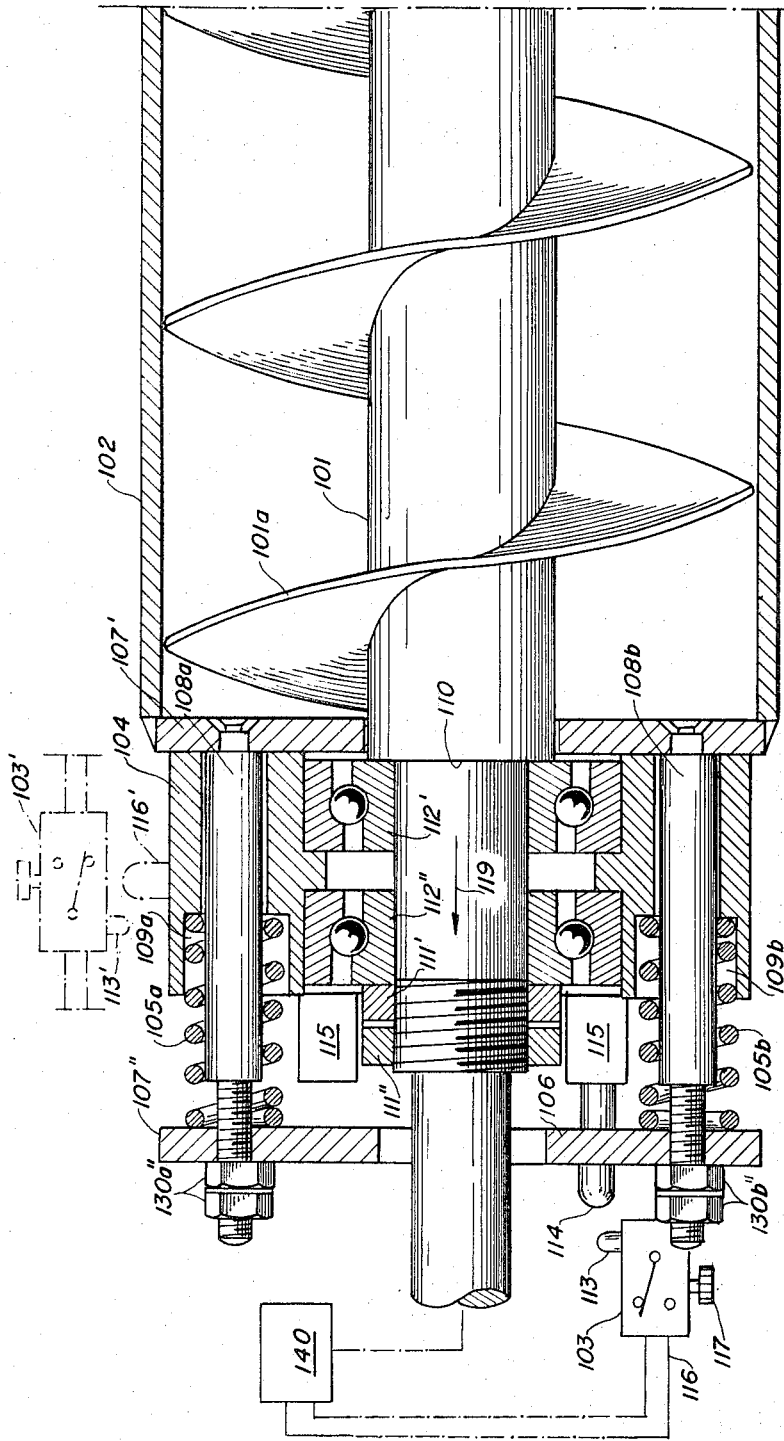

United States Patent Office 3,369,087
Patented Feb. 13, 1968

3,369,087
BEARING ASSEMBLY FOR SHAFTS
AND THE LIKE
Fritz Eller, Kevelohstrasse 29, Essen (Ruhr), Germany
Filed Feb. 15, 1965, Ser. No. 432,668
Claims priority, application Germany, Feb. 22, 1964,
E 26,472
6 Claims. (Cl. 200—47)

ABSTRACT OF THE DISCLOSURE

A torque-responsive bearing assembly having an annular bearing plate axially fixed on a shaft and provided with a pair of axially-spaced oppositely effective radial-thrust ball bearings locked between abutments, a pair of plates flanking the bearing plate and spanned by at least two guide bars axially slidable relatively to the bearing plate, and coil springs surrounding the guide bars and resisting axial displacement of the bearing plate while reacting against the plate flanking them, the bearing plate having switch-actuating members.

My present invention relates to shaft and spindle bearings and like assemblies in which a shaft is journaled with at least limited freedom of axial movement for the control of a switching mechanism or the like.

It has become common practice in the construction and design of machine tools, injection-molding presses, extrusion apparatus and other devices making use of shafts having a helicoidal working portion to journal such shafts in axially displaceable bearing housings provided with thrust bearings and carrying one of a pair of co-operating switch elements for controlling the shaft drive so as to terminate the operation of the shaft or effect a reversal thereof. Such switch mechanisms are employed to prevent overloading of the shaft or to establish a predetermined pressure or timing relationship, as will become apparent hereinafter. Thus, for example, the spindle of a machine tool can be provided with a conventionally threaded portion, with which a carriage can be reasonably engaged or to which the carriage can be affixed for permanent interengagement, whereby rotation of the threaded spindle will cause a linear displacement of the carriage or some other movement thereof depending upon the means connecting the carriage with the spindle. In lathes, milling machines, shapers, automatic and nonautomatic screw machines and the like a switching mechanism of the afore-described type is frequently provided to prevent breakage when the carriage is blocked for one reason or another. Prior to the use of switch means co-operating with the spindle-shaft bearings, damage to the latter was commonplace when an even slightly abnormal resistance interfered with movement of the carriage.

Switch mechanisms of this character also play an important role in the injection-molding and extrusion fields for controlling the operation of so-called plastifying and masticating worms and like member having helicoidal portions which masticate and compress a thermoplastic material prior to its continuous extrusion through a die or its forcible and intermittent discharge into a mold. In both cases, considerable reaction force is applied to the shaft and the fluidifying pressure developed in the masticating or plastifying compartment can be determined by selectively limiting rotation of the shaft carrying the helicoidal ribs in accordance with the axial reaction force applied to a bearing housing in which the shaft is journaled, the control being effected via a switch mechanism co-operating with this housing.

Further examples of apparatus in which prior-art bearing assemblies of this general type have found considerable use are to be found in conveying, feeding and metering installations wherein a screw-type conveyor has its spindle journaled in an axially movable bearing housing co-operating with a switch device for terminating or reversing the rotation of the screw upon the development of inordinately high axial forces.

For the purposes of the present invention and the following description, shafts suitable for the foregoing purposes may be described hereinafter generically as having generally helicoidal ribs adapted to apply an axial force to the shaft upon its rotation in a particular sense. The switch means will then be operative to terminate the rotation in this sense either by halting such rotation altogether, or by reversing the shaft and thereby causing the application of opposite axial forces thereto. The helicoidal ribs of the present disclosure will include threads (both male and female), helicoidal grooves, axially winding plasticizing formations of spiral or helicoidal configuration, feed-screw formations, pitched vanes or blades and equivalent structures.

For the most part, spindles or shafts of the aforedescribed character, when provided with conventional axially shiftable bearing assemblies, were incapable of withstanding large axial forces because of the nature of the bearing assemblies themselves and the manner in which they were mounted for axial movement within whatever housing or support structure was provided. The bearing assemblies were not, moreover, capable of actuating the switch means with assurance since they frequently required lever arms or other elements which possessed play and inaccuracy of position. Another difficulty encountered with conventional systems was the inability to adjust easily both the force necessary to effect a predetermined displacement of the bearing assembly and the switch-actuating stroke thereof; in addition, the conventional systems were subject to disalignment and other mechanical problems since they frequently were cantilevered on whatever support element they were mounted. Thus, earlier bearing assemblies were only suitable for use at relatively low rotary speeds and like axial forces. When higher speeds and large forces were encountered, it was necessary to provide extremely complex custom-built bearings and shaft constructions to overcome the aforedescribed disadvantages.

It is the principal object of the present invention, therefore, to provide a bearing assembly with associated switch mechanism capable of obviating the disadvantages of the conventional systems described above and affording a maximum of economy in the construction of such assemblies with a minimum of structural disadvantages.

Another object of this invention is to provide a bearing assembly for helicoidally ribbed shafts or spindles capable of developing an axial force upon rotation which is able to withstand large axial pressures and operate at high speeds while employing relatively simple components.

The foregoing objects and others which will become apparent hereinafter are attained, in accordance with the present invention, by a bearing assembly for a helicoidally ribbed shaft or spindle wherein the usual housing provided for the bearings is replaced by an annular plate through which the shaft passes and in which a pair of radial-and thrust ball bearings are mounted, the plate being guided upon a plurality of rail means spaced about the axis of the shaft and mounted between a pair of support elements and the bearing plate for yieldably resisting displacement of the latter in one axial direction. The bearing plate further carries one of a pair of co-operating switch elements, preferably an actuating formation, which is engageable with the other switch element upon displacement of the bearing plate against the force of the spring means in the axial direction indicated to terminate rotation of the shaft in the sense causing application of axial force to the shaft in this direction. The axially spaced support elements of the present invention are disposed on opposite sides of the bearing plate and may be affixed to a support portion of the machine housing which can, moreover, constitute one or more of these support elements.

It has been found that the use of a bearing plate between the support elements is essential to reducing the play within the bearing assembly which has long been considered a barrier to the effective application of such units. It is, however, another important and essential characteristic of the present invention that the radial-and-thrust bearings, which will also be described as shoulder bearings for reasons to become apparent subsequently, are mounted upon the shaft between a pair of abutments at least one of which is axially shiftable for tightening the bearings in place. Each of the shoulder bearings can include an inner and outer race, respectively engaged by the shaft and the bearing plate which, according to this invention, prevents axial displacement of the outer races of both bearings toward one another while the two abutments of the shaft prevent axial displacement of the inner races of the two bearings away from one another. As indicated earlier, the actuating element of the switch means is mounted upon the bearing plate which can be provided with suitable stop means preventing overloading (i.e. excessive compression) of the springs. The switch-actuating element may extend in the axial direction or transversely thereto although, in either case, means is provided for axial adjustment of the position of the switch relatively to the bearing assembly.

These structural characteristics of the bearing assembly of the present invention result in a unit whose overall character is such that it constitutes a vast improvement over structures previously used for similar purposes. Among the specific advantages of the improved assembly is the fact that it employs shoulder-type ball bearings which have radial-and-thrust bearing characteristics but are relatively inexpensive and need not be supplemented by thrust-bearing plates or the like, while they nevertheless have long useful lives and long-term freedom from service interruptions. The structure, moreover, permits the disposition of the switch elements in a convenient manner and allows convenient adjustment of the switching stroke and the force necessary to displace the assembly per unit distance.

The above and other objects, features and advantages of the present invention will become more readily apparent from the following description, reference being made to the accompanying drawing in which:

FIG. 3 is a view similar to FIG. 1 of a bearing assembly for a conveyor worm or the like.

Figure 1:
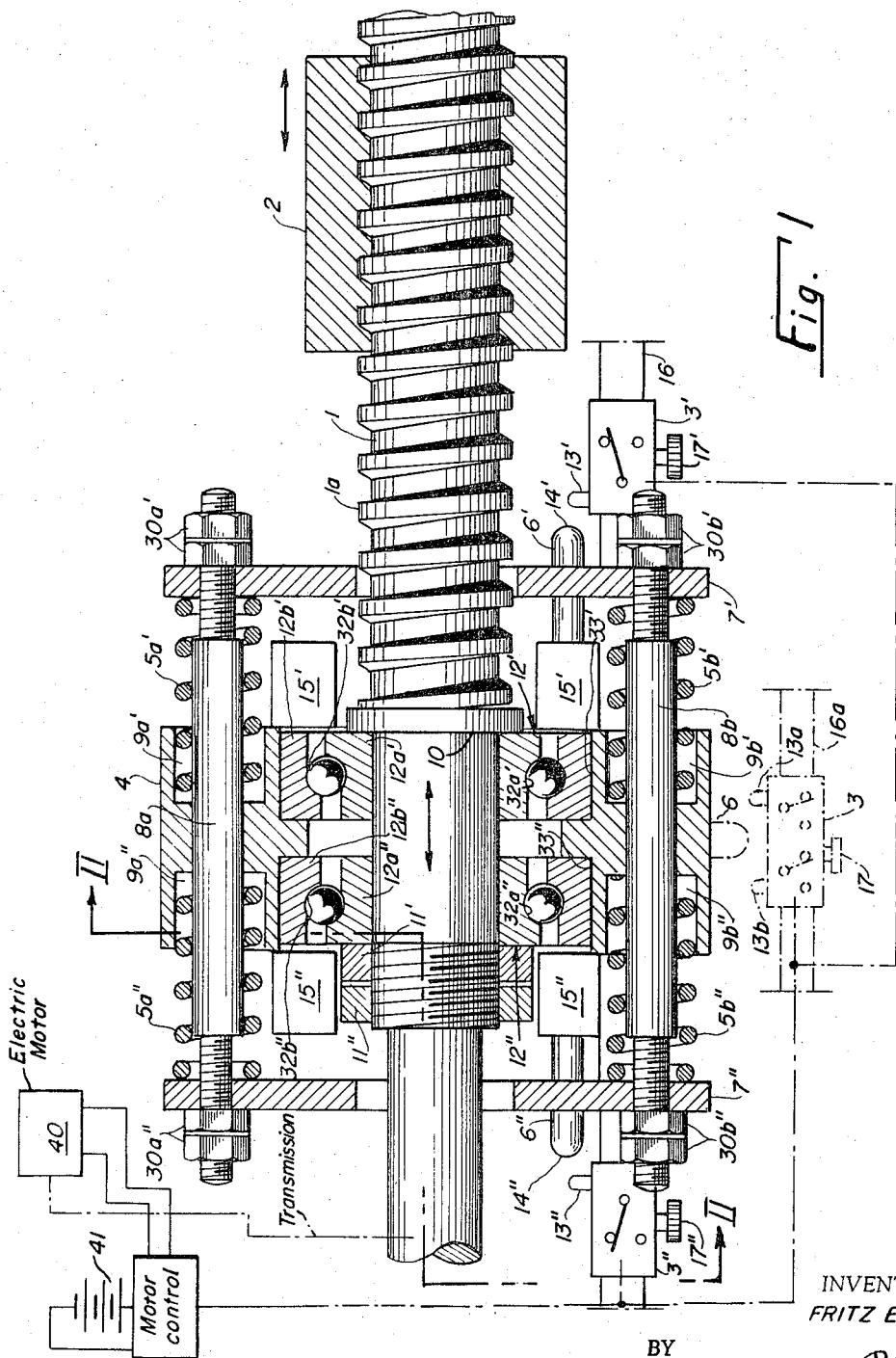
FIG. 1 is an axial cross-sectional view through a bearing assembly for a machine-tool leadscrew spindle, according to the invention.
Figure 2:
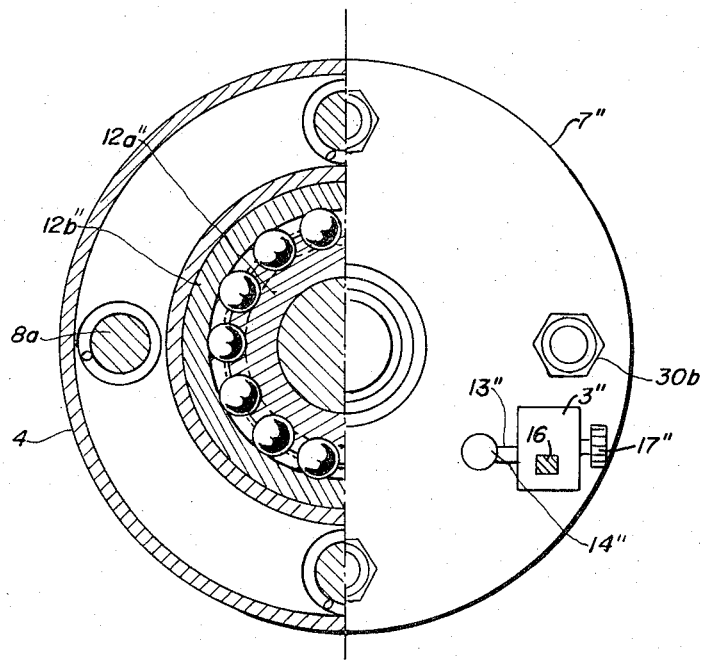
FIG. 2 is a cross-sectional view taken along the line II—II of FIG. 1.

In FIGS. 1 and 2, I show a bearing assembly for a helically threaded leadscrew spindle 1, adapted to be used in a machine tool or the like and to co-operate with a half-nut or other structure 2 mounted on a linearly displaceable carriage, not further illustrated. The left-hand extremity of this axially shiftable leadscrew spindle 1 is provided with an annular shoulder 10 constituting an abutment for a bearing assembly including a pair of shoulder-type radial-and-thrust-roller bearings 12' and 12" disposed in back-to-back relationship on an annular bearing plate 4. The bearing plate 4 is axially guided upon a plurality of angularly equispaced (i.e. two or more) spacing rods 8a, 8b, here shown to be on diametrically opposite sides of the spindle 1, the spacing rods 8a and 8b extending parallel to the axis of the shaft and forming the guide means for the bearing plate 4. The bearing plate 4 is provided with a pair of recesses 9a', 9a" and 9b', 9b" respectively, coaxial with the spacer rods 8a and 8b while opening in opposite axial directions so as to form seats for respective helical compression springs 5a', 5a", and 5b', 5b" respectively. At their right-hand ends (FIG. 1) the spacer rods 8a and 8b are held in place by a support plate 7' which may be affixed to or integral with a machine housing in which the spindle 1 is mounted, and by nuts 30a', 30b' locked against self-loosening as a consequence of machine vibration or the movements of the bearing assembly. At their left-hand extremities, the rods 8a and 8b are similarly held in place by the support plate 7" which may be affixed to or integral with a housing portion, as previously noted; both of the support elements 7', 7" should, in accordance with an important principle of the present invention, be spacially fixed with respect to the limited freedom of movement of the bearing plate 4. Locking nuts 30a" and 30b" serve as abutments against which the respective spacer rods 8a and 8b are held in place.

A pair of nuts 11', 11" hold the bearings 12', 12" axially against the shoulder 10. Each of the bearings 12', 12" consists of an inner race 12a', 12a" fixed to the shaft 1 by the abutment 10 and the nuts 11', 11" in addition to respective outer races 12b', 12b", affixed to the bearing plate 4. The usual angularly spaced balls (caged or uncaged) are provided between these races which are of the shoulder-type having flanks inclined to the axis of the shaft 1 and forming thrust-receiving surfaces. Thus, the outer races 12b' and 12b" are formed with flanks 32b, 32b", respectively turned away from one another outwardly and in the direction of the axis of the spindle 1, whereas the inner races 12a', 12a" are formed with inwardly turned flanks 32a' and 32a" directed away from the axis. The flanks thus engage the balls with a component of axial force in addition to the thrust component mentioned above. Nuts 11 and 11' hold the inner race 12a" against its respective balls and these against the outer race 12b" which is lodged in a recess 33" in the bearing plate 4. The tightening force of these nuts further holds the inner race 12a' against its balls and the outer race 12b' in the annular recess 33'.

The shaft 1 can be driven directly or via any suitable transmission by a drive means represented schematically at 40 and preferably including an electric motor or an electromagnetically operable clutch. The latter can be operated by one or more reversing switches 3, 3' or 3" connected between the drive means 40 and a source of electric current operated by the battery 41. Thus, in the switch positions of the microswitch 3', 3", illustrated in FIG. 1, the drive means 40 rotates the shaft 1, which remains more or less axially fixed until excessive pressure develops, to displace axially the carriage and its threaded connection 2 and encounters an axial force to the left. Upon exceeding a threshold determined by the stiffness of the spring, this reaction force effects displacement of the bearing plate 4 together with the shaft 1 against the force of springs 5a", 5b" until an axially extending actuating stem 6, on the left-hand side of the bearing plate 6", engages the projecting formation 13" of the switch 3" to cause reversal of the motor 40. The operative end of the stem 6" is rounded at 14" to form a camming surface capable of deflecting the formation 13" without applying any substantial axial force thereto. On the right-hand side of the bearing plate 4, there is provided at similar stem 6' with a rounded end 14' engageable with the projecting formation 13' of the switch 3'. The switches 3' and 3" are axially shiftable along a rail 16 (FIGS. 1 and 2) and can be locked in place by the mill-headed thumb screws 17' and 17", respectively Movement of the microswitches 3', 3" to any desired positions and their locking in place via the screws 17', 17" enables adjustment of the stroke within any desired limits of the movement of the bearing plate 4. This arrangement is also advantageous since it permits precise adjustment of the location at which reversal of the screw or the termination of its rotation will occur upon movement of the bearing plate 4 in either direction. A switch 3 can also be provided, in addition to the switches 3' and 3" for initiating other operations of the machine or in place of the switches 3', 3" for operating the drive means 40. The switch 3 co-operates with a stem 6 projecting transversely to the direction of movement of the bearing plate 4. Advantageously, the switch 3 is provided with a pair of projections 13a, 13b of fixed axial spacing thereby ensuring a fixed stroke for the bearing plate 4. The location of the end positions if this stroke is determined by axially shifting the microswitch 3 along a rail 16a and fixing it in place by a thumb screw 17.

To prevent excessive compression of the springs 5a', 5a" and 5b', 5b", the right- and left-hand ends of the bearing plate 4 are provided with fixed, angularly spaced stop members 15', 15" which project axially beyond the shoulder 10 and the nuts 11', 11" for engagement with the support plates 7', 7", respectively, prior to complete compression of the respective springs 5a', 5b' and 5a", 5b". Overloading of the springs is thus precluded.

In the modification of FIG. 3, the shaft 101 is a helically vaned feeding or plasticizing conveyor whereas helical formation 101a, corresponding to the thread 1a of FIG. 1, is surrounded by a housing 102 in which the flowable material is displaced by the screw. The radial-and-thrust bearings 112', 112" are identical in construction with the bearings of FIGS. 1 and 2 but are here held against a shoulder 110 formed by a step of the shaft 101, by the nuts 111', 111". The bearing plate 104 is again guided upon a plurality of angularly spaced spacer bars 108a, 108b fixed to a housing portion 107' forming one of the support elements for the spacer bar. The other support element 107" is held in place by the nuts 130a" and 130b" against the force of the springs 105a and 105b coaxial with the spacer bars and received in the recesses 109a and 109b of bearing plate 104. Abutments 115 prevent excessive compression of the springs 105a, 105b while a stem 106 projects beyond the plate 107" and has a rounded end 114 engageable with the projecting formation 114 of a switch 103 for cutting off the drive means 140 of the shaft 101. It will be apparent that the bearing plate 104 is movable only to the left (arrow 119) from its position shown and can serve to take up the reaction forces only in this one direction. The switch 113 is shiftable upon the rail 116 and can be locked in place by a screw 117. A switch 103' with its projecting formation 113' engageable by the transversely extending stem 116' can also be provided in addition to or in place of switch 103. A double-pole switch of the type shown at 3 in FIG. 1 can be used in the arrangement of FIG. 3 in place of the switch 103', should an axial limit be required for the movement of the plate 104 to the right by the springs 105a and 105b after the plate has been shifted to the left by the reaction forces arising from rotation of the screw 101.

The invention as described and illustrated is believed to admit of many modifications within the ability of persons skilled in the art, all such modifications being considered within the spirit and scope of the appended claims.

I claim:

1. In a torque-responsive switch-actuating apparatus, the improvement which comprises a bearing assembly for a shaft axially displaceable in one direction by an axial component of force in said direction developed upon rotation of said shaft in one sense, said assembly including an annular bearing plate mounted on said shaft and provided with a pair of ball-type bearings axially offset along said shaft, said shaft being formed with a pair of axially spaced opposed abutments retaining said bearings in said plate; a pair of axially spaced support elements on opposite sides of said plate; at least two angularly spaced guide bars spanning said elements and extending parallel to the axis of said shaft while slidably engaging said plate for axially guiding same in said direction and preventing angular displacement of said plate about said shaft, said angularly spaced guide bars being provided with respective adjusting means for varying the distance between said elements and the loading of said spring means; spring means surrounding the guide bars between said plate and at least the one of said elements forwardly of said plate in said direction; and a switch-actuating member on said plate.

2. An assembly as defined in claim 1 wherein said one of said elements and said guide bars are relatively shiftable parallel to said shaft, said spring means includes a compression spring surrounding each of said bars and bearing upon said one of said elements while being seated against said plate, said adjusting means including nuts threadably engaging said guide bars for drawing said one of said elements and said plate together to preload said compression springs and determine the force necessary to shift said shaft and said plate through said predetermined distance, said plate being formed with annular recesses coaxially surrounding each of said guide bars and open in said direction for receiving the respective compression spring, said member extending from said plate generally parallel to said guide bars and said shaft, said one of said elements being formed with an opening passing said member with clearance, whereby a switch disposed in the path of said member forwardly of said one of said elements in said direction is actuatable by said member.

3. An assembly as defined in claim 2 wherein said shaft is provided with a helical working formation adapted to develop said force and said ball-type bearings are oppositely effective radial-and-thrust bearings having respective inner races locked by said abutments to said shaft and provided with inwardly and centrally directed race surfaces, said bearings further comprising respective outer races held against said plate and provided with outwardly and centrally directed race surfaces, and a plurality of respective balls between said surfaces of each pair of inner and outer races.

4. An assembly as defined in claim 3 wherein the other of said elements forms at least part of a housing for said shaft.

5. An assembly as defined in claim 3, further comprising stop means on said plate dimensioned to abut said one of said elements upon displacement of said plate in said direction prior to total compression of said springs.

6. An assembly a defined in claim 3 wherein said plate is provided with an annular shoulder maintaining said bearings apart and retaining each of said bearings between the shoulder and a respective one of said abutments.

References Cited

UNITED STATES PATENTS

| 2,466,426 | 4/1949 | Hoover | 200—47 X |
| 2,683,848 | 7/1954 | Schmitter | 318—475 |
| 3,218,403 | 11/1965 | LeWan | 200—47 |

ORIS L. RADER, *Primary Examiner.*

B. A. COOPER, *Assistant Examiner.*